United States Patent
Ikeno et al.

(10) Patent No.: US 7,639,395 B2
(45) Date of Patent: Dec. 29, 2009

(54) IMAGE-FORMING DEVICE FOR FORMING ISOLATED DOTS

(75) Inventors: Takahiro Ikeno, Owariasahi (JP); Takeshi Kuno, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 608 days.

(21) Appl. No.: 11/453,822

(22) Filed: Jun. 16, 2006

(65) Prior Publication Data

US 2006/0285166 A1   Dec. 21, 2006

(30) Foreign Application Priority Data

Jun. 17, 2005  (JP) .............................. 2005-178066

(51) Int. Cl.
*H04N 1/407* (2006.01)
*H04N 1/409* (2006.01)

(52) U.S. Cl. ...................... 358/1.9; 358/3.02; 358/3.21; 358/3.26; 347/131; 399/27

(58) Field of Classification Search .................. 358/1.9, 358/3.02, 3.06, 3.09, 3.12, 3.21, 3.26, 521, 358/534; 347/131, 251–253; 399/24, 27
See application file for complete search history.

(56) References Cited

U.S. PATENT DOCUMENTS

| | | | |
|---|---|---|---|
| 5,023,632 | A | 6/1991 | Yamamoto et al. |
| 6,239,824 | B1 | 5/2001 | Mutou et al. |
| 6,690,486 | B1 | 2/2004 | Ogoh et al. |
| 7,064,862 | B2 * | 6/2006 | Takashimizu ............... 358/1.9 |
| 2002/0075372 | A1 | 6/2002 | Nagumo et al. |
| 2004/0156645 | A1 | 8/2004 | Nakazato |
| 2005/0036687 | A1 | 2/2005 | Ishiguro |

FOREIGN PATENT DOCUMENTS

| | | |
|---|---|---|
| CN | 1588237 A | 3/2005 |
| EP | 0533377 A2 | 3/1993 |
| EP | 0537789 A2 | 4/1993 |
| EP | 1059802 A2 | 12/2000 |
| JP | 2001045299 | 2/2001 |
| JP | 2003175639 | 6/2003 |
| JP | 2005064862 | 3/2005 |

OTHER PUBLICATIONS

Partial EP Search Report dtd Dec. 28, 2007, EP Application 06012303.1.

(Continued)

*Primary Examiner*—Scott A Rogers
(74) *Attorney, Agent, or Firm*—Banner & Witcoff, Ltd.

(57) ABSTRACT

An image-forming device includes: a data conversion unit; an isolated-dot size determining unit; and an image-forming unit. The data conversion unit converts, for each of a plurality of pixels in an image to be formed, original image data indicative of a multilevel density into dot data indicative of whether or not a dot should be formed. The isolated-dot size determining unit determines the size of an isolated dot according to a condition. The image-forming unit forms an image on a recording medium by selectively forming a dot for each pixel based on the dot data, while forming the isolated dot with the determined size.

6 Claims, 7 Drawing Sheets

OTHER PUBLICATIONS

Extended EP Search Report dtd May 19, 2008, EP Appln. 06012303.1.

Shimada et al., Society for Imaging Science and Technology: "Optimization of Imaging Process in a High Resolution Laser Printer," Proc. of the International Congress on Advances in Non-Impact Printing Technologies, San Diego, CA, Nov. 12-17, 1089, Springfield, SPSE, US, vol. Congress 5, Nov. 12, 1989, pp. 309-319 (XP000138908).

CN Office Action dtd May 9, 2008, CN Appln. 200610093062.7.

* cited by examiner

IMAGE-FORMING DEVICE FOR FORMING ISOLATED DOTS

CROSS REFERENCE TO RELATED APPLICATION

This application claims priority from Japanese Patent Application No. 2005-178066 filed Jun. 17, 2005. The entire content of this priority application is incorporated herein by reference.

TECHNICAL FIELD

The disclosure relates to an image-forming device.

BACKGROUND

Electrophotographic image-forming devices that form images through a process of irradiating a laser beam onto a photosensitive member to form an electrostatic latent image thereon and depositing developer on the latent image are well known in the art. When rendering gradations, for example, this type of image-forming device often produces dots having no neighboring dots (i.e., isolated dots). Since isolated dots can lead to a decline in image quality due to skipped dots or the like, it is desirable to take measures to process these isolated dots. For example, Japanese unexamined patent application publication No. P2001-45299A proposes a technique for emphasizing isolated dots to an extent that does not affect nearby pixels.

SUMMARY

However, the emphasizing process described in Japanese unexamined patent application publication No. P2001-45299A fails to perform suitable image formation.

In view of the foregoing, it is an object of the invention to provide an improved image-forming device configured to form isolated dots appropriately.

In order to attain the above and other objects, the invention provides an image-forming device including: a data conversion unit; an isolated-dot size determining unit; and an image-forming unit. The data conversion unit converts, for each of a plurality of pixels in an image to be formed, original image data indicative of a multilevel density into dot data indicative of whether or not a dot should be formed. The isolated-dot size determining unit determines the size of an isolated dot according to a condition. The image-forming unit forms an image on a recording medium by selectively forming a dot for each pixel based on the dot data, while forming the isolated dot with the determined size.

According to another aspect, the invention provides an image-forming device including: a data conversion unit; an image-forming unit; a mode-setting unit; and a controlling unit. The data conversion unit converts, for each of a plurality of pixels in an image to be formed, original image data indicative of a multilevel density into dot data indicative of whether or not a dot should be formed. The image-forming unit forms an image on a recording medium by selectively forming a dot for each pixel based on the dot data. The mode-setting unit sets a mode of the image-forming unit to either one of a first gradation mode in which the data conversion unit converts a first type of image data into dot data, and a second gradation mode in which the data conversion unit converts a second type of image data into dot data, the first type of image data indicating a density level among a first number of density levels, the second type of image data indicating a density level among a second number of density levels, the second number being smaller than the first number. The controlling unit controls the image-forming unit to execute a dot modification process to form images of isolated dots in the first gradation mode with sizes smaller than images of isolated dots formed in the second gradation mode.

According to another aspect, the invention provides an image-forming device including: an image-forming unit; a developer-accommodating unit; a consumption-detecting unit; and a controlling unit. The image-forming unit forms images on a recording medium. The developer-accommodating unit accommodates developer. The consumption-detecting unit detects the amount of developer consumed from the developer-accommodating unit. The controlling unit controls the image-forming unit to execute a dot modification process to form images of isolated dots with a size larger when the amount of consumed developer detected by the consumption-detecting unit reaches a reference amount than when the reference amount has not been reached.

According to another aspect, the invention provides an image-forming device including: an image-forming unit; a plurality of developer-accommodating units; and a controlling unit. The image-forming unit forms images on a recording medium. The plurality of developer-accommodating units accommodates developer of a plurality of different colors. The controlling unit controls the image-forming unit to execute a dot modification process to form images of isolated dots in developer of at least one color at a different size than the images of isolated dots formed of developer in the other colors.

BRIEF DESCRIPTION OF THE DRAWINGS

Illustrative aspects in accordance with the invention will be described in detail with reference to the following figures wherein:

FIGS. 5A-5C are explanatory diagrams illustrating isolated dots rendered in different ways, wherein

DETAILED DESCRIPTION

An image-forming device according to some aspects of the invention will be described while referring to the accompanying drawings wherein like parts and components are designated by the same reference numerals to avoid duplicating description.

Figure 1:
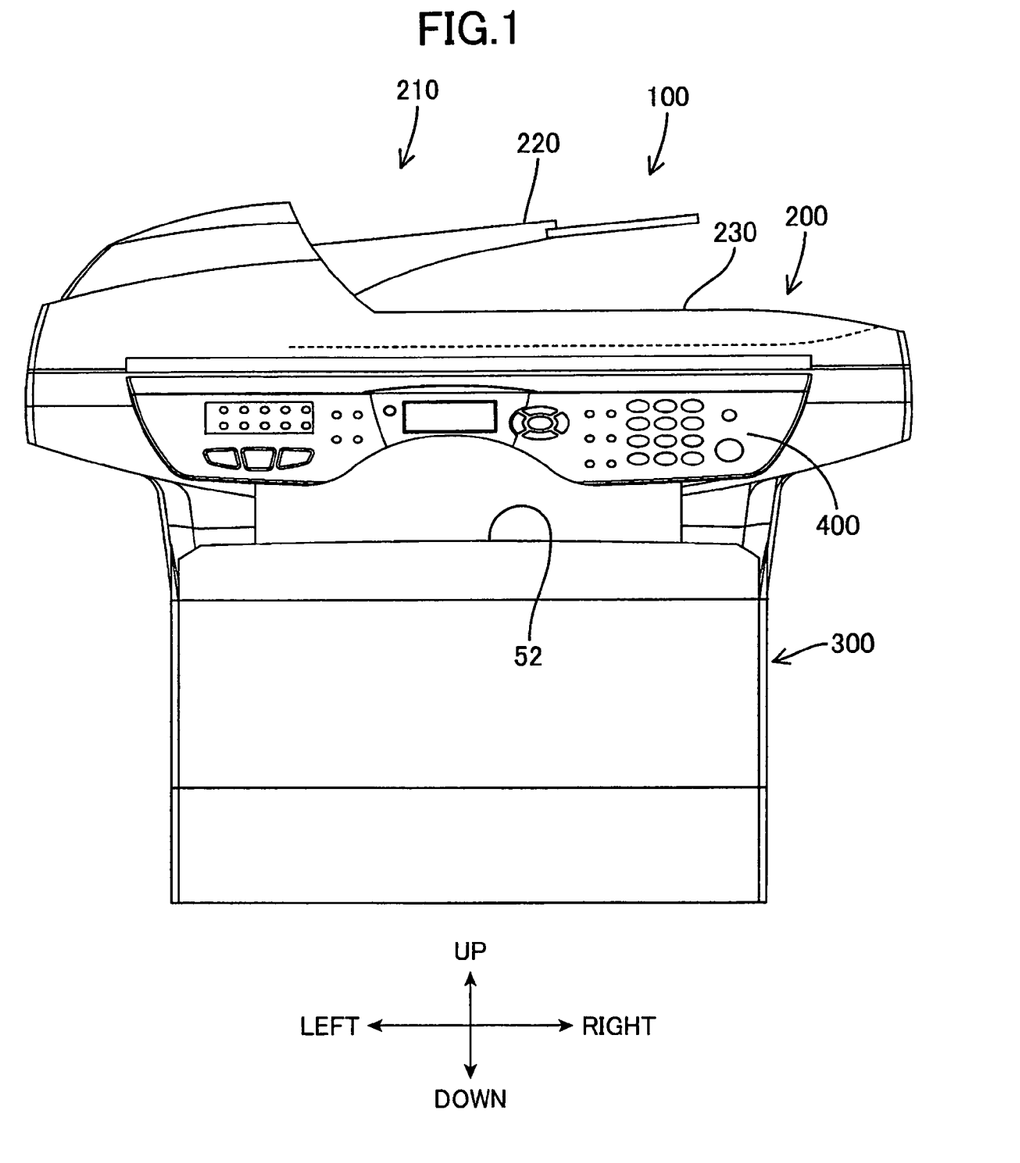
FIG. 1 is a front view of a multifunction device according to one aspect of the invention.

FIG. 1 is a front view of a multifunction device 100 according to one aspect of the invention. In the following description, the downstream side of the multifunction device 100 with respect to a discharge direction in which paper is discharged onto a discharge tray 52 (FIG. 3) will be referred to as the "front side," and the opposite side as the "rear side." Further, a left-to-right direction orthogonal to the front-to-rear direction will be referred to as a "width direction."

1. General Structure of the Multifunction Device

As shown in FIG. 1, the multifunction device 100 includes an image-reading unit 200 for reading an original, an image-forming unit 300 for forming images on a paper based on image data for the original read by the image-reading unit 200, and a control panel 400 for performing operations with the multifunction device 100. After the image-forming unit 300 forms an image on a sheet of paper, the paper is discharged through a discharge opening 323 (see FIG. 3). The discharge tray 52 is provided on top of the image-forming unit 300 for receiving and supporting the paper discharged through the discharge opening 323. The image-reading unit 200 is disposed above the discharge tray 52 so as to cover the entire top portion thereof.

Figure 2:
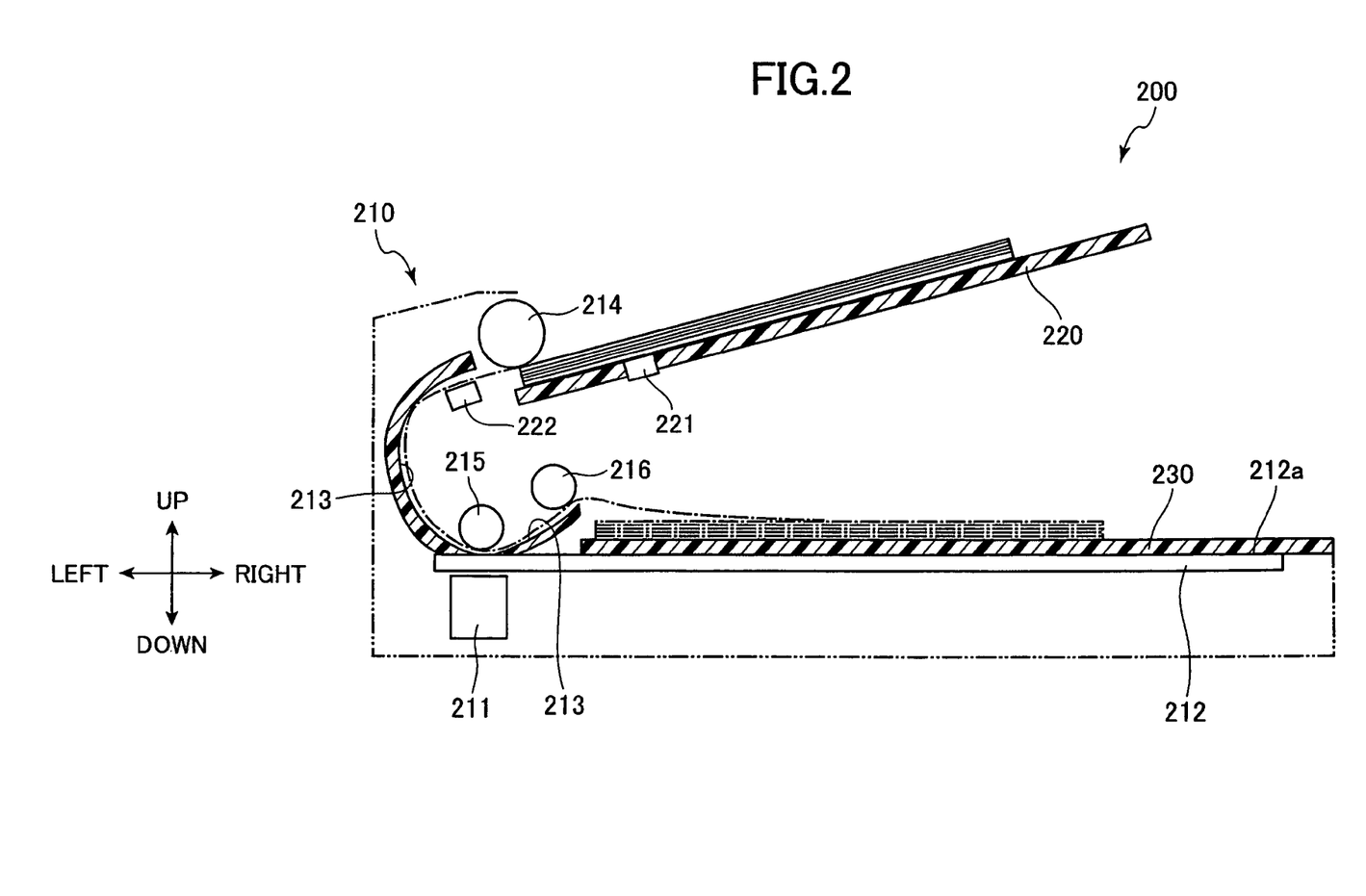
FIG. 2 is an explanatory diagram conceptually illustrating an image-reading unit of the multifunction device in FIG. 1.

As shown in FIG. 2, the image-reading unit 200 includes an original tray 220 for supporting an original document, an automatic document feeder (ADF) 210 for conveying the original supported on the original tray 220 to be scanned by a CCD image sensor 211 built into the ADF 210, and a discharge tray 230 for receiving the original discharged by the ADF 210. The original tray 220 is provided with a document sensor 221 configured of a photosensor for detecting when an original is loaded in the tray.

The original tray 220, ADF 210, and discharge tray 230 constitute a cover portion that can rotate open and closed on the front side of the multifunction device 100 about a support shaft (not shown) provided on the rear side of the multifunction device 100. A transparent glass plate 212 is provided beneath the discharge tray 230 for supporting an original when the original is to be scanned according to a flatbed method. The glass plate 212 is exposed when the cover portion is open.

A conveying path 213 is formed in an arc for guiding an original document placed on the original tray 220 to a position where the original document is placed over the CCD image sensor 211 with the glass plate 212 interposed therebetween. The original document is further guided along the conveying path 213 onto the discharge tray 230. A feeding roller 214 for separating the sheets of original document on the original tray 220 and feeding the original document one sheet at a time onto the conveying path 213 is disposed at the upstream end of the conveying path 213 in the document conveying direction. A pressure roller 215 is disposed on the conveying path 213 opposite the CCD image sensor 211 for pressing the original document against the glass plate 212 as the original document passes over the CCD image sensor 211. A discharge roller 216 for discharging the original document onto the discharge tray 230 is disposed at the downstream end of the conveying path 213 with respect to the document conveying direction. Further, a paper sensor 222 for detecting passage of the original documents is disposed near the feeding roller 214 along the conveying path 213.

The CCD image sensor 211 is a line sensor extending along a direction orthogonal to the document conveying direction. A plurality of photodiodes (not shown) is arranged along this extended direction. The individual photodiodes receive reflected light when a light source (not shown) irradiates a strong light on the original document, and the CCD image sensor 211 converts the intensity (brightness) of the reflected light for each pixel of the original document to electric signals. By converting these signals to digital data with an A/D converter (not shown), the image-reading unit 200 can read the image formed on the original document as image data.

The image-reading unit 200 can scan an original document either when the original document is placed on a plate surface 212a of the glass plate 212 or when using the ADF 210. In the former case, the CCD image sensor 211 moves across the plate surface 212a of the glass plate 212, while scanning the original document supported on the glass plate 212 one line at a time. In the latter case, the CCD image sensor 211 is moved to the left end of the glass plate 212 so as to oppose the pressure roller 215 via the glass plate 212. While fixed in this position, the CCD image sensor 211 scans one line of the original document at a time as the original document is conveyed by the ADF 210.

Figure 3:
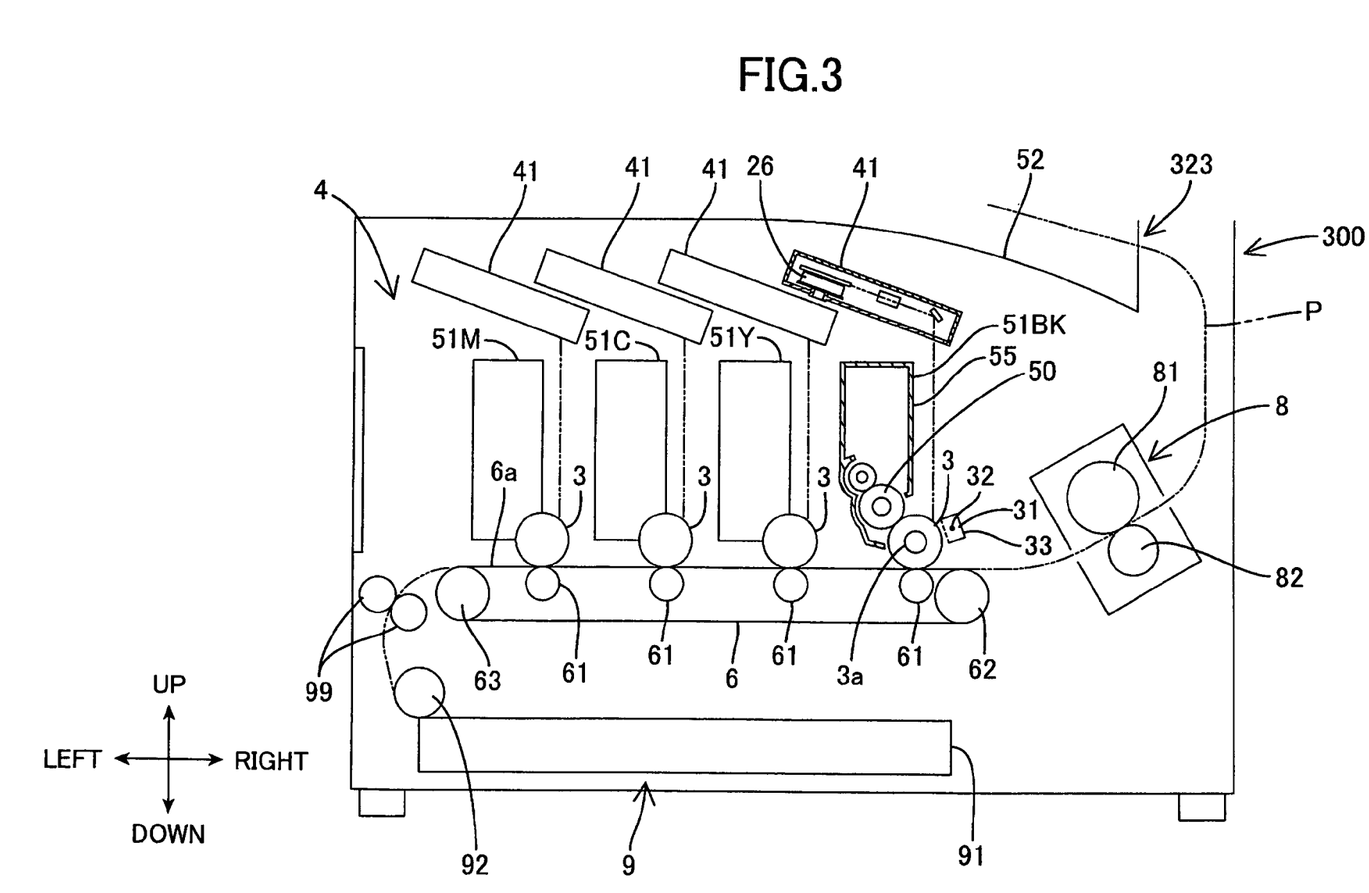
FIG. 3 is an explanatory diagram conceptually illustrating an image-forming unit of the multifunction device in FIG. 1.

Next, the structure of the image-forming unit 300 will be described. As shown in FIG. 3, the image-forming unit 300 includes a toner image-forming unit 4, a conveying belt 6, a fixing unit 8, a feeding unit 9, and the discharge tray 52. The image-forming unit 300 is configured to form images in four colors on a paper P according to image data.

The toner image-forming unit 4 includes four developing units 51M, 51C, 51Y, and 51BK (hereinafter collectively referred to as developing units 51) accommodating toner of the colors magenta (M), cyan (C), yellow (Y), and black (BK), respectively. For each of the developing units 51, the toner image-forming unit 4 includes a photosensitive drum 3, a charger 31 (only shown for the developing unit 51BK in FIG. 3), and an exposure device 41. Since each of the developing units 51 has the same structure, internal components of the developing units 51 are shown only for the developing unit 51BK in FIG. 3.

The photosensitive drums 3 in the toner image-forming unit 4 are configured of substantially cylindrical members and are arranged parallel to one another and at substantially regular intervals along a horizontal direction. Each photosensitive drum 3 is capable of rotating about a drum shaft 3a. The cylindrical member of the photosensitive drum 3 is configured of an aluminum base member that is coated with a positive charging photosensitive layer, for example. The aluminum base member is connected to a ground line of the image-forming unit 300.

The charger 31 is a Scorotron charger disposed in confrontation with the photosensitive drum 3. The charger 31 includes a charging wire 32 extending in the width direction of the charger 31, and a shielding case 33 open on the side confronting the photosensitive drum 3 and housing the charging wire 32.

Each of the exposure devices 41 is arranged to expose the respective photosensitive drum 3 at a point downstream of the charger 31 in the rotational direction of the photosensitive drum 3. Each exposure device 41 includes a polygon mirror with reflective surfaces, a polygon motor 26 for driving the polygon mirror to rotate, and a light source for emitting a laser beam based on one color's worth of the image data to be scanned via the reflecting surfaces of the rotating polygon mirror and irradiated onto the surface of the photosensitive drum 3. In FIG. 3, only the internal structure of the exposure device 41 corresponding to the developing unit 51BK is shown. However, the exposure devices 41 corresponding to the developing units 51M, 51C, and 51Y have the same structure. When the exposure device 41 irradiates a laser beam onto the surface of the photosensitive drum 3 according to prescribed image data, the surface potential at exposed regions of the photosensitive drum 3 is reduced, forming an electrostatic latent image on the surface of the photosensitive drum 3.

As represented by the developing unit 51BK in FIG. 3, each of the developing units 51 includes a developer case 55 for accommodating toner, and a developing roller 50 disposed in the developer case 55. The developing roller 50 is disposed so as to contact the photosensitive drum 3 downstream of the exposure device 41 in the rotational direction of the photosensitive drum 3. Each of the developing units 51 charges the toner with a positive polarity and supplies the charged toner to the photosensitive drum 3 as a uniform thin layer. According to the reverse development method, the positively charged toner develops the electrostatic latent image of positive polarity formed on the photosensitive drum 3 into a visible image at the area of contact between the developing roller 50 and photosensitive drum 3.

The feeding unit 9 is configured of a paper cassette 91 for accommodating the paper P, and a pickup roller 92 for picking up and feeding sheets of the paper P. Sheets of paper P fed by the pickup roller 92 are received and conveyed to the conveying belt 6 by a pair of conveying rollers 99.

The conveying belt 6 is an endless belt for conveying the paper P supported on a top surface thereof. The conveying belt 6 is looped around a drive roller 62 and a follow roller 63. Transfer rollers 61 are disposed inside the conveying belt 6 at positions opposite each of the photosensitive drums 3. When the drive roller 62 rotates, the conveying belt 6 moves circularly so that the top surface of the conveying belt 6 on the side opposing the photosensitive drums 3 moves from front to rear. Consequently, the conveying belt 6 conveys the paper P received from the conveying rollers 99 to the fixing unit 8 past each of the photosensitive drums 3 in sequence.

A constant current source (not shown) is connected to the transfer rollers 61 for applying a transfer bias to the transfer rollers 61 of a polarity opposite that of the toner for transferring toner onto the paper P. Hence, the transfer roller 61 causes the toner image formed on the photosensitive drum 3 to transfer onto the paper P being conveyed on the conveying belt 6.

The fixing unit 8 includes a heating roller 81 and a pressure roller 82. After toner images of the four colors have been transferred onto the paper P, the heating roller 81 and pressure roller 82 apply heat and pressure to the paper P while conveying the paper P tightly pinched therebetween, thereby fixing the toner image on the paper P. After the fixing process, the paper P is discharged onto the discharge tray 52 on top of the image-forming unit 300.

Next, an image-forming operation performed with the image-forming unit 300 will be described. As shown in FIG. 3, the pickup roller 92 feeds one sheet of the paper P from the feeding unit 9. The conveying rollers 99 receive and convey the sheet onto the conveying belt 6.

Next, the charger 31 in the most front side position charges the surface of the most front side photosensitive drum 3 (the photosensitive drum 3 corresponding to the magenta developing unit 51M) uniformly at a prescribed voltage. The exposure device 41 exposes the surface of the photosensitive drum 3 based on image data for magenta, forming an electrostatic latent image in the exposed areas having a lower potential than other regions of the photosensitive drum 3. Next, a positive developing bias is applied to the developing roller 50 in the developing unit 51M so that positively charged magenta toner is supplied from the developing roller 50 to the surface of the photosensitive drum 3. Due to the developing bias, the magenta toner is deposited only on areas of the photosensitive drum 3 having a lower potential, that is, the areas corresponding to the latent image. The toner develops the latent image into a positively charged toner image. At this time, a negative transfer bias is applied to the transfer rollers 61 for transferring the positively charged toner image onto the surface of the paper P conveyed on the conveying belt 6. After the transfer operation, the paper P carries a positively charged image of magenta toner.

Subsequently, the paper P is sequentially conveyed to positions opposing the photosensitive drums 3 for the remaining toner colors cyan, yellow, and black, where procedures identical to that performed for magenta toner are performed to form toner images on the surfaces of the respective photosensitive drums 3 and to superposes the toner images onto the paper P. After toner images for all four colors have been formed on the paper P, the fixing unit 8 fixes the four-color toner image to the paper P and discharges the paper P onto the discharge tray 52.

2. Electrical Structure

Figure 4:
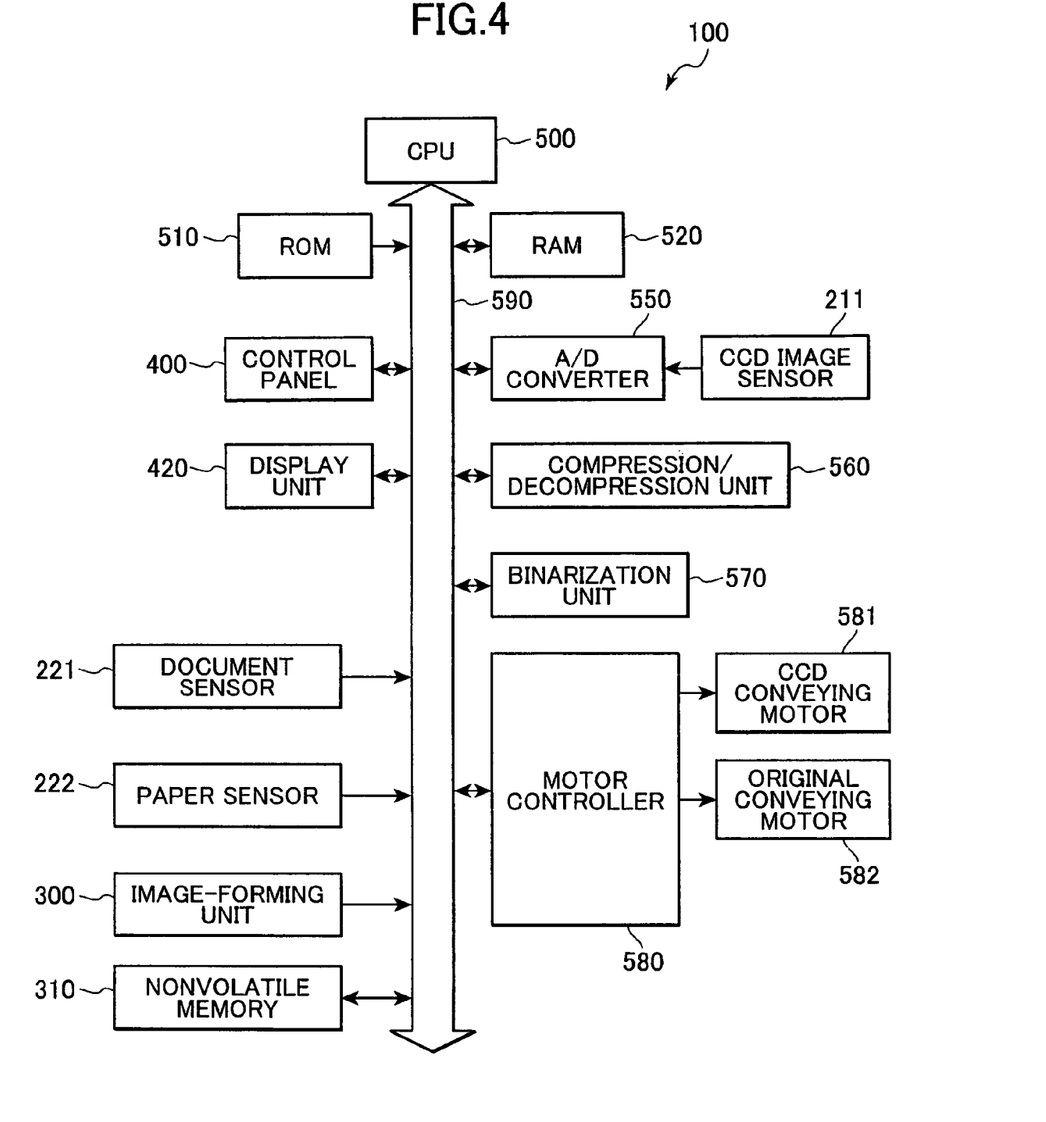
FIG. 4 is a block diagram showing the electrical structure of the multifunction device in FIG. 1.

Next, the electrical structure of the multifunction device 100 will be described with reference to FIG. 4. As shown in FIG. 4, the multifunction device 100 includes a CPU 500, a ROM 510, a RAM 520, the control panel 400, a display unit 420, the document sensor 221, the paper sensor 222, the image-forming unit 300, a nonvolatile memory 310, the A/D converter 550, a compression/decompression unit 560, a binarization unit 570, and a motor controller 580, all of which are connected via a bus 590.

The CPU 500 performs overall control of the multifunction device 100. The ROM 510 stores various programs, including a printing program to be described later with reference to FIG. 6A, executed by the CPU 500; and various settings, initial values, and the like. The RAM 520 temporarily stores data when the CPU 500 performs data processing.

The A/D converter 550 converts analog data read by the CCD image sensor 211 for an image formed on an original into digital data to serve as image data.

The binarization unit 570 converts multilevel density data in the image data (numerical data indicating the brightness of each pixels on the original) into binary data (a process of converting the multilevel density data for each pixel of the image data into one bit of data based on a threshold value) by using an error diffusion method.

The compression/decompression unit 560 performs a compression process (encoding) for reducing the amount of binary image data, and a decompression process (decoding) for restoring the compressed image data to its original uncompressed state.

The motor controller 580 functions to control a CCD conveying motor 581 serving to move the CCD image sensor 211 when scanning an original placed on the glass plate 212 (see FIG. 2), and an original conveying motor 582 serving to drive the feeding roller 214, pressure roller 215, and discharge roller 216 in the ADF 210 and paper-conveying rollers (not shown), for example. The motor controller 580 is connected to other drive motors, as well.

The image-forming unit 300 can form images read by the image-reading unit 200 in a high gradation mode or a low gradation mode. By performing an operation on the control panel 400, the user can set the image-forming unit 300 to the high gradation mode when inputting his/her instruction to form photographic images or can set the low gradation mode when inputting his/her instruction to form text images. This mode data is stored in the RAM 520.

Thus, the multifunction device 100 is set to the high gradation mode when forming photographic images and to the low gradation mode when forming text images. Therefore, photographic images that require a high gradation can be depicted with a large number of density levels, while text images that do not require a very high gradation are depicted with fewer density levels and with a more stable density.

In the high gradation mode, image formation is executed based on high gradation image data that represents high gradation images with a large number of density levels (256 halftone levels of 0 to 255, for example). The binarization unit 570 compares the multilevel density data value (0-255) for each pixel with a predetermined threshold value (128, for example), converts the subject multilevel density data into binary data (dot-forming data or non-dot-forming data), determines a difference between the original value of the multilevel density data and the value of the converted binary data (255 (dot-forming data) or 0 (non-dot-forming data)), and distributes the difference to the multilevel density data for adjacent pixels.

In the low gradation mode, image formation is executed based on low gradation image data that represents images with a smaller number of density levels (sixteen halftone levels of 0 to 15, in this example). The binarization unit 570 compares the multilevel density data value (0-15) for each pixel with a predetermined threshold value (8, for example), converts the subject multilevel density data into binary data (dot-forming data or non-dot-forming data), determines a difference between the original value of the multilevel density data and the value of the converted binary data (15 (dot-forming data) or 0 (non-dot-forming data)), and distributes the difference to the multilevel density data for adjacent pixels.

The image-forming unit 300 can form images in a high resolution (1,200×600 dpi, in this example) and in a low resolution (300×600 dpi, in this example). The user can operate the control panel 400 to input resolution data indicating whether image formation is desired to be performed in high resolution or low resolution, and the resolution data is stored in the RAM 520. Or, the user may input the resolution data into the multifunction device 100 through his/her operations on a computer or other external device.

3. Dot Conversion Process

Next, a dot conversion process will be described.

Figure 5A:
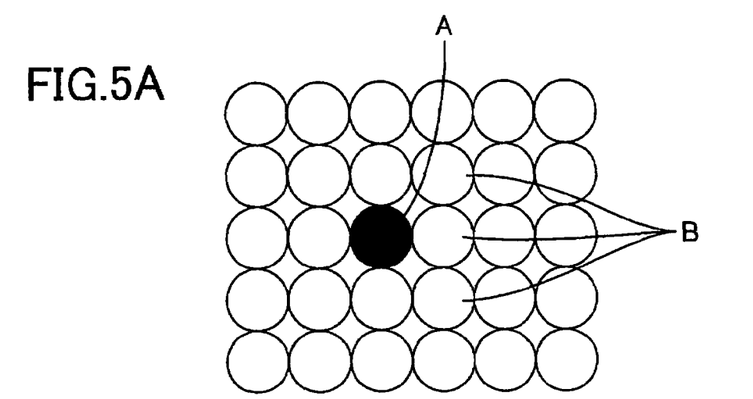
FIG. 5A is an explanatory diagram conceptually illustrating an isolated dot with a 1-dot size.

The image-forming unit 300 shown in FIG. 3 is configured to form images based on image data having a plurality of dots. This plurality of dots includes image-forming dots for forming an image of dots and non-image-forming dots for not forming an image of dots. Each exposure device 41 regulates a laser beam in order to form an electrostatic latent image on the corresponding photosensitive drum 3 based on dot data. The image-forming dots in the image data may include isolated dots having no image-forming dots around the periphery thereof. FIG. 5A is an explanatory diagram conceptually illustrating an isolated dot. As shown in FIG. 5A, an image-forming dot A is an isolated dot because non-image-forming dots B surround the image-forming dot A.

As described above, the multifunction device 100 includes the plurality of developing units 51 accommodating toner of a plurality of different colors. Further, the multifunction device 100 is capable of detecting the amount of toner consumed in each developing unit 51. The amount of consumed toner is detected by counting the number of image-forming dots of each color for each printing operation and accumulating these counted values for each color in subsequent operations. The amount of consumed toner detected for each color (i.e., the accumulated value for each color) is stored in the nonvolatile memory 310 and continuously updated. The CPU 500 functions to count the image-forming dots for each color.

The multifunction device 100 also determines whether the amount of consumed toner for each color has reached a reference amount. More specifically, a threshold value is set for the accumulated value of each color. The threshold values for the respective colors may be the same as or different from one another. The CPU 500 determines whether the accumulated value of each color has reached the threshold value. When the accumulated value of a color has reached the threshold value, the CPU 500 determines that the amount of consumed toner for that color has reached the reference amount.

When the amount of consumed toner for a color has reached the reference amount, the CPU 500 controls the image-forming unit 300 to form images of isolated dots in that color larger than images of isolated dots formed when the consumed amount has not reached the reference amount.

More specifically, of the toner accommodated in the developer case 55 of the developing units 51, the smaller sized particles of toner tend to be consumed quicker. Therefore, as the amount of toner consumption progresses, the ratio of large-particle toner remaining in the developer case 55 increases. Since larger sized particles of toner are generally less likely to adhere to the photosensitive drum 3 and the paper P, skipped dots are more likely to occur as toner consumption progresses, unless some measures are taken.

Therefore, as described above, the image-forming unit 300 forms larger images of isolated dots when the amount of consumed toner has reached the reference amount than when the amount of consumed toner has not yet reached the reference amount. In other words, the image-forming unit 300 expands the size of the isolated dots under conditions in which the toner has a large ratio of large-sized particles in order to increase the chance of the particles adhering. Accordingly, the image-forming unit 300 effectively suppresses skipped dots when toner consumption has progressed to a certain level in order to maintain an appropriate image quality. As described above, the image-forming unit 300 determines the amount of toner consumption for each color and adjusts the image size of isolated dots in each color in order to form images of the isolated dots suitably and flexibly in response to the conditions for each color.

Figure 6A:
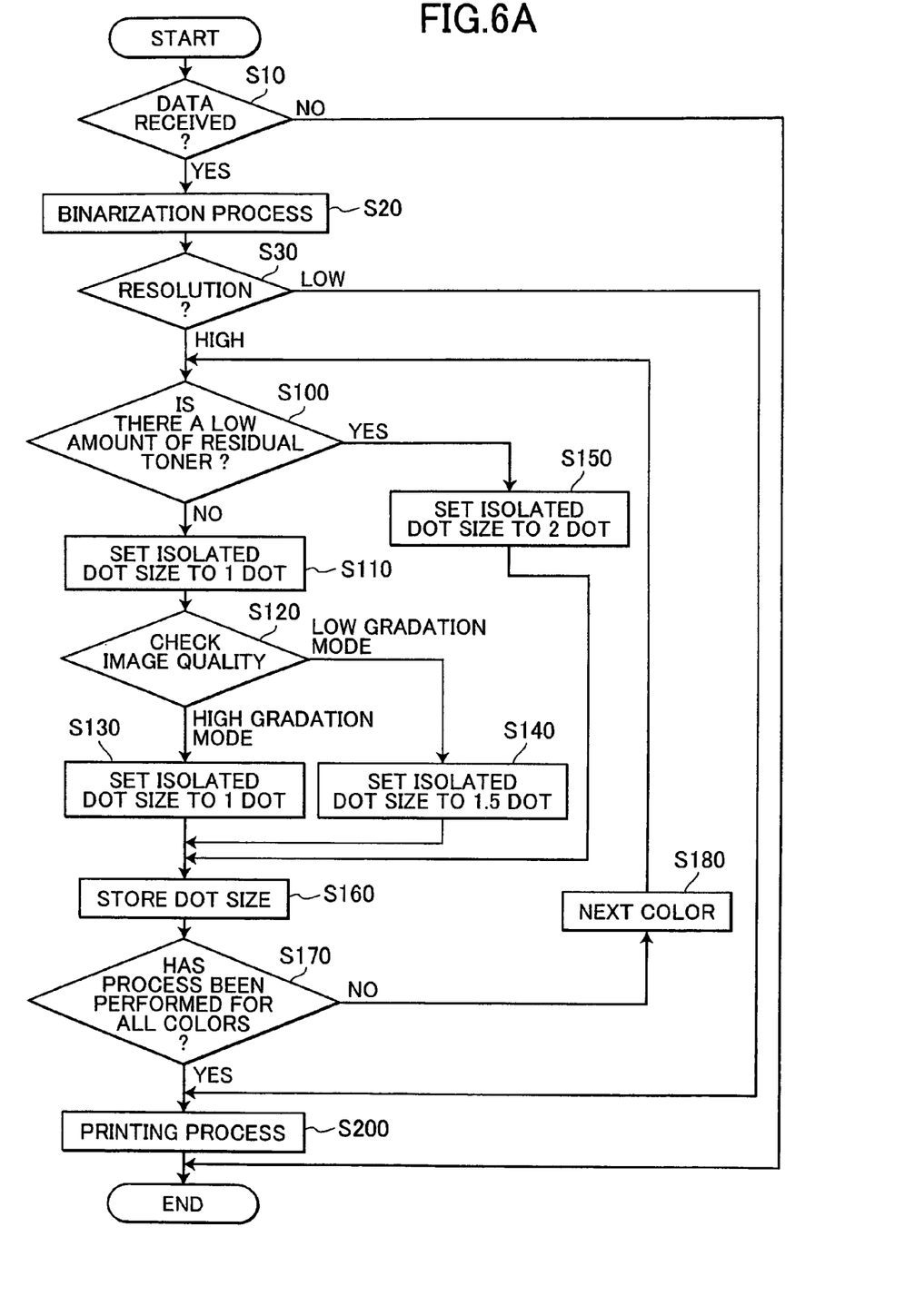
FIG. 6A is a flowchart illustrating steps in a printing process according to the aspect.

Next, steps in a printing process will be described with reference to FIG. 6A. The dot conversion process is a part of the printing process. FIG. 6A is a flowchart showing steps in the printing process. The CPU 500 executes the printing process according to the program stored in the ROM 510. Here, we will describe an example of this process in which the image-forming unit 300 forms an image based on image data read by the image-reading unit 200.

The CPU 500 starts the printing process in S10 when a set of image data (multilevel density data) for an image to be printed is received from the image-reading unit 200.

Next, in S20, the CPU 500 controls the binarization unit 570 to convert the received multilevel density data into binary data by using the error diffusion method. That is, if the multifunction device 100 is in the high gradation mode, the binarization unit 570 converts a multilevel density value (0-255) for each pixel into a binary value (dot-forming data or non-dot-forming data) while distributing a generated error to adjacent pixels. If the multifunction device 100 is in the low gradation mode, the binarization unit 570 converts a multilevel density value (0-15) for each pixel into a binary value (dot-forming data or non-dot-forming data) while distributing a generated error to adjacent pixels.

Next, in S30, the CPU 500 judges whether or not printing should be executed for the received image data in a high resolution (1,200×600 dpi, for example) or in a low resolution (300×600 dpi, for example). More specifically, the CPU 500 determines which resolution has been set by the user by referencing the data stored in the RAM 520 indicative of which resolution the user has designated, in order to determine whether to perform the dot conversion process.

If printing should be executed at a low resolution, the CPU 500 determines not to execute the dot conversion process, and the program proceeds directly to S200, wherein the CPU 500 controls the image forming unit 300 to form dot images based on the binary data.

On the other hand, if printing should be executed at a high resolution, the CPU 500 detects in S100 whether the amount of toner remaining for a certain color, such as magenta, is low. This detection is performed based on whether the amount of consumed toner has reached the reference amount, as described above, that is, whether the accumulated value of the dot count has reached the threshold value.

Figure 5B:
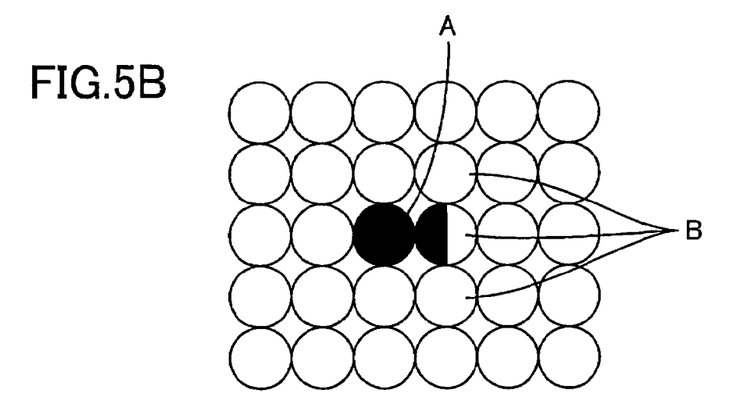
FIG. 5B is an explanatory diagram conceptually illustrating the case of adjusting the isolated dot size to 1.5 dots.
Figure 5C:
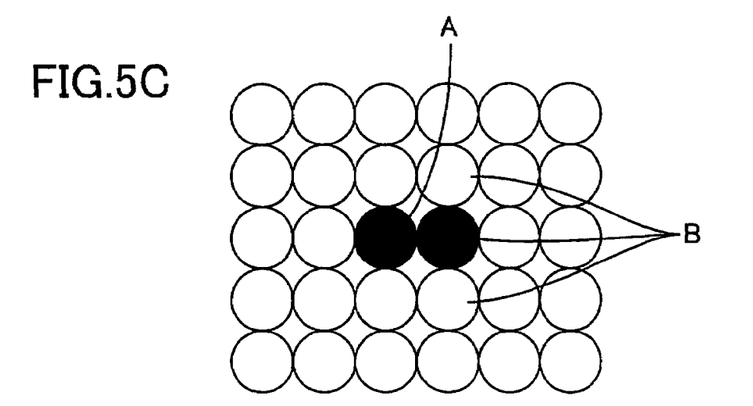
FIG. 5C is an explanatory diagram conceptually illustrating the case of adjusting the isolated dot size to 2.0 dots.

If the amount of residual toner for the color in question is low, that is, if the accumulated value of counted dots for the toner has reached the threshold value (S100: YES), then in S150 the CPU 500 enlarges the isolated dots of that color to a size greater than the normal size (1 dot). In this example, the isolated dots are set to twice the normal size, or two dots. FIG. 5C is an explanatory diagram conceptually illustrating an isolated dot being adjusted to 2.0 dots. When isolated dots are set to 2.0 dots, a laser beam adjustment described later will be performed in S200 to form images of the isolated dots like that shown in FIG. 5C.

On the other hand, if the accumulated value of counted dots has not yet reached the threshold value (S100: NO), then in S110 the isolated dot size is provisionally set to the normal size (1 dot).

In S120 the CPU 500 confirms the image quality setting. More specifically, the CPU 500 determines which mode has been set between the high gradation mode and the low gradation mode. The CPU 500 checks the image quality by referencing data stored in the RAM 520 to determine which mode has been set between the high gradation mode and the low gradation mode.

When the multifunction device 100 is set to the high gradation mode, the CPU 500 advances to S130 and sets the isolated dot size to the normal size (1 dot).

On the other hand, if the multifunction device 100 has been set to the low gradation mode, the CPU 500 advances to S140 and sets the isolated dot size to a larger size (1.5 dots in this example). Hence, isolated dots are formed of a smaller image in the high gradation mode than in the low gradation mode. Consequently, the image-forming unit 300 will form images in S200 based on these settings. FIG. 5B is an explanatory diagram conceptually illustrating the case of adjusting the isolated dot size to 1.5 dots. When the isolated dot size is set to 1.5 dots, a laser beam adjustment described later will be performed in S200 to form images of the isolated dots like that shown in FIG. 5B.

By forming smaller images of isolated dots in the high gradation mode than in the low gradation mode, it is possible to increase the reproducibility of image regions having a lighter density to more accurately depict density levels while suppressing graininess. However, in the low gradation mode where graininess is not a major problem, the images of isolated dots are formed larger to suppress skipped dots. Accordingly, the process in S120-S140 serves to set an appropriate isolated dot size for the gradation state of an image to be formed.

Since the dot size is adjusted according to the types or qualities of the images to be formed, various types of images, including the photographic images and the text images, can be rendered at an appropriate number of density levels with consideration for the properties of the image, while setting an appropriate isolated dot size according to the type of image.

In S160 the CPU 500 stores the dot size data set in S130, S140, or S150 described above in the RAM 520 for the color in question.

In S170 the CPU 500 determines whether the process of S100-S160 has been performed for all colors (magenta, yellow, cyan, and black). If the process has not yet been completed for all colors (S170: NO), then the process proceeds to S180, and the CPU 500 repeats the process in S100-S160 for the next color.

However, if the isolated dot size has been set for all colors (S170: YES), then the process proceeds to S200, wherein printing is executed.

In this way, the dot size for each color is set with consideration for the amount of consumed toner in S100-S170 (dot conversion process), before being printed. Accordingly, the image sizes of isolated dots formed by the respective colors will possibly become different from one another when toners of the respective colors are consumed differently.

In S200, the image-forming unit 300 forms images based on dot data included in the binary image data and adjusts the laser beam for isolated dots in the dot data with consideration for the dot size set in S160. It is noted that the image-forming unit 300 adjusts the size of respective dots by controlling the output of a laser beam from the exposure device 41 (more specifically, the laser light outputted from the light source provided in the exposure device 41). The dot size is adjusted by controlling the length of time that the laser beam is irradiated from the exposure device 41. The image-forming unit 300 adjusts the size of isolated dots that is set in S160 by controlling the length of time that the laser beam is irradiated from the exposure device 41 to form the isolated dots. The isolated dot size is expanded by increasing the length of time that the laser beam is irradiated from the exposure device 41. For example, when the isolated dot size is set to 1.0 dot, the irradiation time is set to the normal time, thereby forming an image of the isolated dot, as shown conceptually in FIG. 5A. When the isolated dot size is set to 1.5 dots, the irradiation time is set to 1.5 times the normal time, thereby forming an image of the isolated dot, as shown conceptually in FIG. 5B. When the isolated dot size is set to 2.0 dots, the irradiation time is set to two times the normal time, forming an image as shown in FIG. 5C.

It is noted that in the process shown in FIG. 6A, regardless of which gradation mode the multifunction device 100 is set in, if the amount of consumed toner reaches the reference amount (yes in S100), the CPU 500 sets the isolated dot size to a 2-dot size that is larger than the isolated dot size of 1-dot size or 1.5-dot size that will be set when the amount of consumed toner has not reached the reference amount. Hence, among the size that is determined based on the amount of consumed toner and the size that is determined based on the gradation states, the multifunction device 100 gives priority to the size that is determined when the amount of consumed toner reaches the reference amount. Accordingly, the multifunction device 100 gives priority to suppressing skipped dots in order to produce stable images.

It is noted that in S20, the multilevels of densities in the images read by the image-reading unit 200 are converted by the binarization unit 570 into binary levels according to the error diffusion method. When thus converting the multilevels into binary levels according to the error diffusion method, isolated dots will likely to occur. Because the error diffusion method is employed in S20, the dot conversion process of S30-S170 for setting an appropriate isolated dot size is particularly useful.

It is also noted that in S30, the CPU 500 determines that the dot conversion process of S100-S170 should be performed when performing image formation at a high resolution and that the dot conversion process should not be performed when performing image formation at a low resolution.

When forming image formation at a high resolution, the original image can be easily reproduced, even when converting the image size of isolated dots to sizes different from the original sizes. Therefore, by performing the dot conversion process of S100-S170 when the high resolution is set, it is possible both to reproduce the original image and to form images of the isolated dots that are suitable for the conditions. However, when forming images at a low resolution, it is difficult to reproduce the original image if the size of the isolated dots is modified needlessly. This possible problem is resolved by not performing the dot conversion process of S100-S170 when images will be formed at the low resolution.

<Modification>

In the above description, the 1-dot size is preset the same for all the colors. The length of time that the laser beam is irradiated from the exposure device 41 to form a dot of the 1-dot size is preset equal for all the colors. That is, in S200, the CPU 500 adjusts the length of time that the laser beam is irradiated to form a dot of the 1-dot size to be equal for all the colors. However, the 1-dot size may be preset different for the respective colors. In other words, the length of time that the laser beam is irradiated from the exposure device 41 to form a dot of the 1-dot size may be preset different for the respective colors. In S200, the CPU 500 may adjust the length of time that the laser beam is irradiated to form a dot of the 1-dot size to be different for the respective colors.

It is noted that toners of respective colors are made of different kinds of developing material. Accordingly, toners of respective colors have different characteristics. For example, it is now assumed that yellow toners are less likely to adhere to the photosensitive drum 3 and the paper than toners of the other colors. In such a case, skipped dots are more likely to occur for yellow than for other colors. Accordingly, the 1-dot size for yellow may be preset greater than the 1-dot size for the other remaining colors, in order to increase the chance of yellow particles adhering. For example, the 1-dot size for yellow may be preset to a value that is obtained by multiplying the 1-dot size for the other remaining colors by 1.1. In other words, the length of time that the laser beam is irradiated from the exposure device 41 to form a dot of the 1-dot size for yellow may be preset to a value that is obtained by multiplying by 1.1 the length of time that the laser beam is irradiated from the exposure device 41 to form a dot of the 1-dot size for the other colors.

According to this modification, by executing the process of FIG. 6A while presetting the 1-dot size for yellow different from other colors, the dot size for the isolated dots is determined not only based on the resolution, the toner consumption amount, and the gradation of the original image, but also on the color. If the isolated-dot for yellow is determined in S150 to be expanded to 2-dot size, the isolated-dot size for yellow will be adjusted, in S200, 2.2 (=2×1.1) times the normal 1-dot size for other colors. It is possible to form images of the isolated dots more suitably and flexibly dependently on the conditions including the color.

In this modification, a unique isolated dot size is preset for each color by presetting, to a unique value, the length of time that the laser beam is irradiated to form 1-dot size for each color. That is, the 1-dot size for at least one particular color (yellow, in this example) is preset larger than the 1-dot size of the other colors. The isolated dot size for the respective colors is controlled in S30-S180 dependently on the amount of consumed toner, the resolution, and the gradation.

It is noted that the isolated dot size for the at least one particular color (yellow, in this example) may be always set different from the isolated dot size of the other colors, irrespective of the amount of consumed toner, the resolution, and the gradation. In other words, the processes of S30-S180 may be omitted from the process of FIG. 6A. In this case, the size of isolated dots formed by the at least one particular color can be made different from the size of isolated dots formed by other colors without regard to the amount of consumed toner, the resolution, and the gradation.

Or, the isolated dot size for the at least one particular color (yellow, for example) may be always set different from other colors except under specific conditions of the toner consumption amount. That is, the processes of S30, S120, S130, and S140 may be omitted from the process of FIG. 6A.

Or, the isolated dot size for the at least one particular color (yellow, for example) may be always set different from other colors except under specific conditions of the gradation. That is, the processes of S30, S100, S110, and S150 may be omitted from the process of FIG. 6A.

<Another Modification>

Figure 6B:
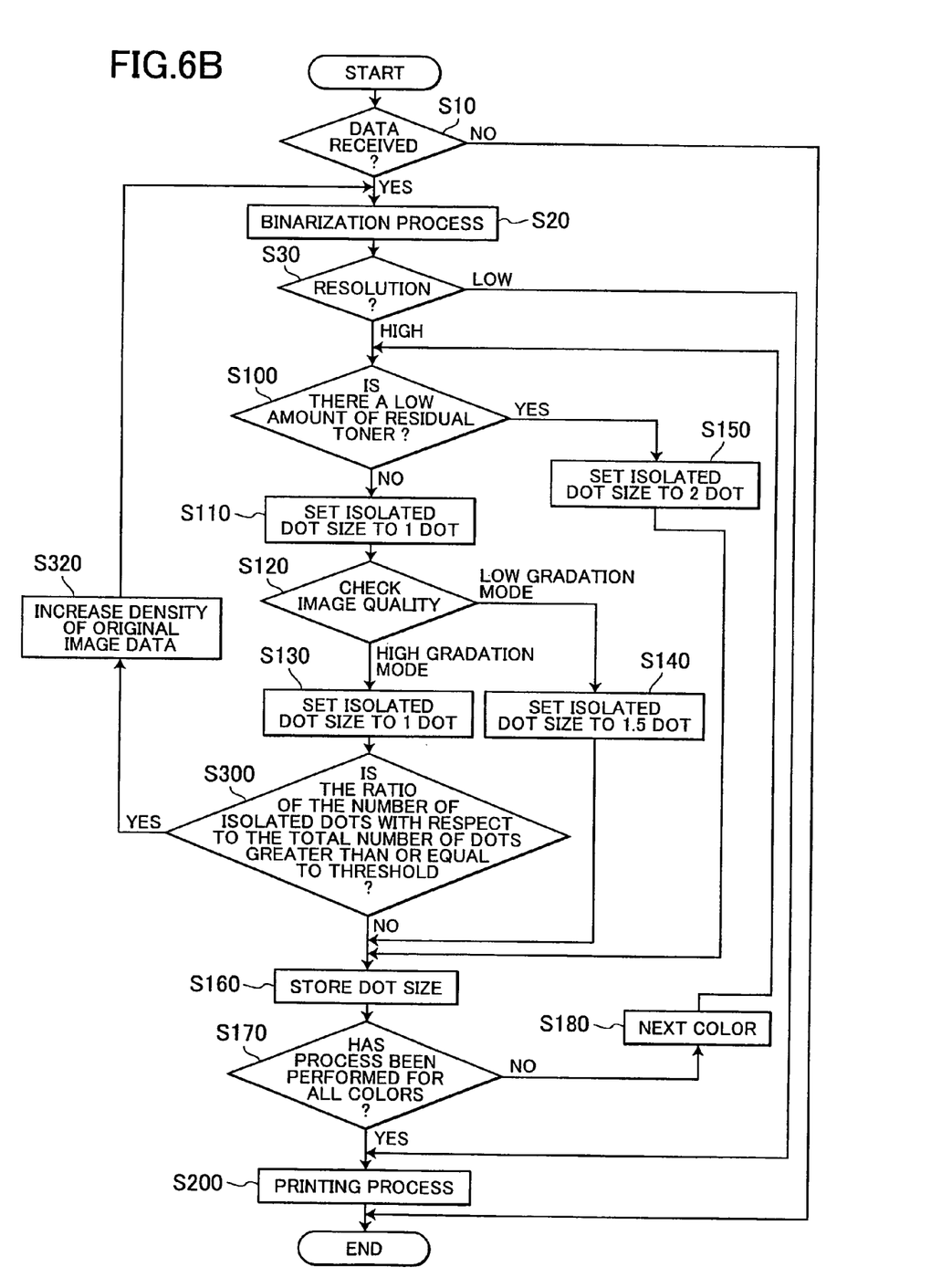
FIG. 6B is a flowchart illustrating steps in a printing process according to a variation.

As shown in FIG. 6B, after the process of S130, a process of S300 may be added. In S300, the CPU 500 judges, for the color in question, whether or not a ratio or percentage of the number of the isolated dots (the number of pixels on which the isolated dots are allocated) with respect to the total number of dots (the number of pixels on which dots (non-isolated dots or isolated dots) are allocated) in the image to be printed is greater than or equal to a predetermined threshold (50%, in this example).

If the percentage of the number of the isolated dots with respect to the total number of dots is smaller than the threshold (no in S300), it is determined that the image of the subject color has a sufficiently high density and therefore that the printed image will not suffer from skipped dots. Accordingly, the program proceeds to S160.

On the other hand, if the percentage of the number of isolated dots with respect to the total number of dots is greater than or equal to the threshold (yes in S300), it is determined that the image of the subject color has a relatively low density and therefore that the printed image will possibly suffer from skipped dots and will become too light. Accordingly, the process proceeds to S320, wherein the values of the multi-level densities for all the pixels in the original image data are increased for the subject color. For example, the original multilevel density values for all the pixels in the image for the subject color are multiplied by a predetermined fixed rate greater than one (1). Then, the program returns to S20, in which the conversion process is executed onto the thus modified density values. The processes of S20-S130 are executed repeatedly until the percentage of the number of isolated dots with respect to the total number of dots becomes smaller than the threshold (no in S300).

The above-described process can increase the density of the image data prior to forming images of isolated dots when it is determined in S130 not to increase the size of the isolated dots from the normal 1-dot size. That is, the CPU 500 judges in S300 whether or not a relatively large number of isolated dots exist in the image for the color in question, prior to forming the image, and increases the overall density of the image data when a relatively large number of isolated dots are present in the image for the subject color.

Specifically, skipped dots are more likely to appear when forming isolated dots of small size, potentially leading to an unstable image density. Therefore, by performing a process to increase the density of the image data prior to setting the size of the isolated dots to a small size, the frequency of isolated dots is reduced. Accordingly, it is possible to suppress the occurrence of skipped dots and achieve a more stable density.

It is noted that in S320, the multilevel density values for all the pixels in the image are increased for the subject color. However, the multilevel density values for all the pixels in the image may be increased for all the colors in S320.

The process of S300 may be executed after S170 and before S200. In this case, the process of S300 may be modified to judge whether or not the isolated dots for the respective colors have been set to 1-dot size and whether or not the percentages of the numbers of isolated dots for the respective colors with respect to the total numbers of pixels are greater than or equal to the threshold. Only when the isolated dots have been set to 1-dot size for all the colors and the percentages of the numbers of isolated dots with respect to the total numbers of pixels are greater than or equal to the threshold for all the colors, the process proceeds from S300 to S320. In S320, the multilevel density values for all the pixels in the image are increased for all the colors.

While the invention has been described in detail with reference to the above aspects thereof, it would be apparent to those skilled in the art that various changes and modifications may be made therein without departing from the spirit of the invention.

For example, the process of S30 may be omitted. It is possible to execute the dot conversion process of S100-S180 regardless of whether the printing will be executed at a high or low resolution.

While the image-forming unit 300 is capable of forming color images, the invention may also be applied to a monochrome image-forming unit having only one developing unit and only one developer case. In this case, the image-forming unit can obtain the same effects as described above by detecting the amount of consumed toner in the developer case, and performing the same process (excluding S170 and S180) in FIG. 6A or FIG. 6B.

While the above-described multifunction device 100 detects the amount of consumed toner by counting image-forming dots, the amount of consumed toner can be detected in other manners, directly or indirectly. For example, the amount of consumed toner can be indirectly determined by counting the accumulated number of printed sheets.

While the above-described multifunction device 100 adjusts the dot size with consideration for both the amount of consumed toner and image quality, the dot size may also be adjusted without regard for image quality. In this case, the processes in S120, S130, and S140 are omitted from the processes of FIGS. 6A and 6B. While this method loses the benefits obtained when considering image quality, a configuration for adjusting the isolated dot size based on the amount of consumed toner is simple to implement.

While the above-described multifunction device 100 adjusts the dot size with consideration for both the amount of consumed toner and image quality, the dot size may also be adjusted without regard for the amount of consumed toner. In this case, the processes in S100, S110, and S150 are omitted from the process of FIGS. 6A and 6B. While this method loses the benefits obtained when considering the amount of consumed toner, a configuration for adjusting the isolated dot size based on the gradation is simple to implement.

While the above description is directed to the case where printing is performed based on image data read with the image-reading unit 200, the same printing process may be performed on data acquired from an external device, such as a computer.

In the above description, the image-forming unit 300 can form images in the high resolution of 1,200×600 dpi and in the low resolution of 300×600 dpi. However, the image-forming unit 300 may be modified to form images in any desired resolution. Also in this case, the user can operate the control panel 400 or an external computer or other external devices to input resolution data indicating resolution, at which image formation is desired to be performed. The resolution data is stored in the RAM 520. In this case, the CPU 500 may determine in S30 that the resolution is a high resolution when the resolution data exceeds a prescribed threshold value and a low resolution when the resolution data does not exceed the threshold value.

What is claimed is:

1. An image-forming device comprising:
a data conversion unit configured to convert, for each of a plurality of pixels in an image to be formed, original image data indicative of a multilevel density into dot data indicative of whether or not a dot is to be formed;
an isolated-dot size determining unit that determines the size of an isolated dot according to a condition; and
an image-forming unit configured to form an image on a recording medium by selectively forming a dot for each pixel based on the dot data, while forming the isolated dot with the determined size,
a developer-accommodating unit configured to accommodate developer, the image-forming unit forming the image by using the developer accommodated in the developer-accommodating unit; and
a consumption-detecting unit configured to detect the amount of developer consumed from the developer-accommodating unit,
wherein the isolated-dot size determining unit is configured to determine the size of the isolated dot so that the size of the isolated dot that is determined when the amount of consumed developer reaches a reference amount is greater than the size of the isolated dot that is determined when the amount of consumed developer does not reach the reference amount.

2. An image-forming device according to claim 1, wherein the isolated-dot size determining unit is configured to determine the size of the isolated dot according to color at which the isolated dot is to be formed.

3. An image-forming device according to claim 1, wherein the data conversion unit is configured to convert a first type of original image data indicative of a density among a first number of different density levels into the dot data, and is configured to convert a second type of original image data indicative of a density among a second number of different density levels into the dot data, the second number being smaller than the first number, and
wherein the isolated-dot size determining unit is configured to determine the size of the isolated dot obtained from the first type of original image data to be smaller than the size of the isolated dot obtained from the second type of original image data.

4. An image-forming device according to claim 3, wherein the first type of original image data is indicative of a photographic image, and the second type of original image data is indicative of a text image.

5. An image-forming device according to claim 1, further comprising:
a resolution determining unit configured to determine whether a resolution, by which the image-forming unit is to form the image, is a first resolution or a second resolution smaller than the first resolution; and a resolution-dependent-controlling unit that controls, when the resolution is the first resolution, the isolated-dot size determining unit being configured to determine the size of the isolated dot according to the condition, and that controls, when the resolution is the second resolution, the isolated-dot size determining unit being configured to determine the size of the isolated dot to a predetermined value regardless of the condition.

6. An image-forming device according to claim 1, wherein the isolated-dot size determining unit determines the size of an isolated dot as either one of a size that is greater than a size of a non-isolated dot and another size that is equal to the size of the non-isolated dot according to the condition, wherein the image-forming unit forms the image based on the dot data when the isolated-dot size determining unit determines the size of the isolated dot as the another size equal to the size of the non-isolated dot and a ratio of the number of the isolated dots relative to the total number of dots in the image to be formed is smaller than a threshold and when the isolated-dot size determining unit determines the size of the isolated dot as the size greater than the size of the non-isolated dot, further comprising a density increasing unit configured to increase the multilevel density of the original image data when the isolated-dot size determining unit determines the size of the isolated dot as the size equal to the size of the non-isolated dot and the ratio of the isolated dots relative to the total number of dots in the image is greater than or equal to the threshold, the data conversion unit converting, for each pixel, the density-increased original image data into dot data.

* * * * *

UNITED STATES PATENT AND TRADEMARK OFFICE
CERTIFICATE OF CORRECTION

PATENT NO. : 7,639,395 B2
APPLICATION NO. : 11/453822
DATED : December 29, 2009
INVENTOR(S) : Ikeno et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 804 days.

Signed and Sealed this

Ninth Day of November, 2010

David J. Kappos
*Director of the United States Patent and Trademark Office*